US012062769B2

United States Patent
Sauerteig et al.

(10) Patent No.: US 12,062,769 B2
(45) Date of Patent: Aug. 13, 2024

(54) BATTERY PACK AND TREATMENT SYSTEM

(71) Applicants: Andreas Stihl AG & Co. KG, Waiblingen (DE); Murata Manufacturing Co., Ltd., Nagaokakyo (JP)

(72) Inventors: Daniel Sauerteig, Kernen im Remstal (DE); Julien Scholl, Waiblingen (DE); Takayuki Sato, Koriyama (JP); Daiki Misawa, Koriyama (JP); Malte Von Hofen, Stuttgart (DE); Atsushi Chinen, Koriyama (JP); Daniel Wagner, Winterbach (DE); Marcel Wilka, Boebingen (DE)

(73) Assignees: Andreas Stihl AG & Co. KG, Waiblingen (DE); Murata Manufacturing Co., Ltd., Nagaokakyo (JP)

( * ) Notice: Subject to any disclaimer, the term of this patent is extended or adjusted under 35 U.S.C. 154(b) by 249 days.

(21) Appl. No.: 16/869,857

(22) Filed: May 8, 2020

(65) Prior Publication Data
US 2020/0358054 A1    Nov. 12, 2020

(30) Foreign Application Priority Data

May 10, 2019   (EP) ..................... 19173789

(51) Int. Cl.
*H01M 10/6561*   (2014.01)
*H01M 10/48*      (2006.01)
(Continued)

(52) U.S. Cl.
CPC ..... *H01M 10/6561* (2015.04); *H01M 10/482* (2013.01); *H01M 10/486* (2013.01);
(Continued)

(58) Field of Classification Search
CPC ............. H01M 10/486; H01M 10/647; H01M 10/6556; H01M 10/482; H01M 10/613;
(Continued)

(56) References Cited

U.S. PATENT DOCUMENTS

| 5,480,734 A | 1/1996 | Schulz et al. |
| 8,434,940 B2 | 5/2013 | Lachenmeier et al. |

(Continued)

FOREIGN PATENT DOCUMENTS

| CN | 107946680 A | 4/2018 |
| DE | 10 2008 001 286 A1 | 10/2009 |

(Continued)

OTHER PUBLICATIONS

Chinese-language Office Action issued in Chinese Application No. 202010383311.6 dated Jun. 27, 2023 with partial English translation (16 pages).
Japanese-language Office Action issued in Japanese Application No. 2020-081680 dated May 7, 2024 (5 pages).

*Primary Examiner* — Stewart A Fraser
*Assistant Examiner* — Lilia Nedialkova
(74) *Attorney, Agent, or Firm* — Crowell & Moring LLP

(57) ABSTRACT

A battery pack supplies an electrically driven treatment apparatus with an electric driving power, and includes: a stack limiting structure; a plurality of pouch cells, wherein the pouch cells are disposed in a stack, wherein the stack is disposed within the stack limiting structure; an outer temperature sensor, wherein the outer temperature sensor is disposed and configured for measuring an outer temperature of the stack outside the stack at an edge of the stack or the stack limiting structure, and/or outside the stack limiting structure; and a control device. The control device is configured for comparison of the measured outer temperature and/or a quantity based on the measured outer temperature to at least one temperature comparative value. The at least (Continued)

one temperature comparative value is a function of at least one of the pouch cells. The control device is configured for controlling the battery pack in response to a result of the comparison.

13 Claims, 12 Drawing Sheets

(51) Int. Cl.

| | | |
|---|---|---|
| *H01M 10/613* | (2014.01) | |
| *H01M 10/647* | (2014.01) | |
| *H01M 10/658* | (2014.01) | |
| *H01M 50/211* | (2021.01) | |
| *H01M 50/247* | (2021.01) | |
| *H01M 50/296* | (2021.01) | |
| *H01M 50/224* | (2021.01) | |

(52) U.S. Cl.
CPC ....... *H01M 10/613* (2015.04); *H01M 10/647* (2015.04); *H01M 10/658* (2015.04); *H01M 50/211* (2021.01); *H01M 50/247* (2021.01); *H01M 50/296* (2021.01); *H01M 50/224* (2021.01); *H01M 2220/30* (2013.01)

(58) Field of Classification Search
CPC .......... H01M 10/6561; H01M 10/658; H01M 50/211; H01M 50/224; H01M 50/247; H01M 50/296; H01M 2220/30; B25F 5/00; Y02E 60/10; Y02P 70/50
See application file for complete search history.

(56) References Cited

U.S. PATENT DOCUMENTS

| | | |
|---|---|---|
| 9,793,581 B2 | 10/2017 | Henrici et al. |
| 2011/0027632 A1* | 2/2011 | Higashino ........... H01M 10/613 |
| | | 429/83 |
| 2011/0042117 A1 | 2/2011 | Doege et al. |
| 2015/0132621 A1 | 5/2015 | Henrici et al. |
| 2015/0380697 A1 | 12/2015 | Osborne et al. |
| 2016/0141728 A1* | 5/2016 | Fauteux ........... H01M 10/6235 |
| | | 429/61 |
| 2016/0222631 A1* | 8/2016 | Kohno ................ H01M 10/613 |
| 2016/0233561 A1 | 8/2016 | Lee |
| 2017/0256833 A1* | 9/2017 | Ciaccio ............. H01M 10/0481 |
| 2018/0040864 A1 | 2/2018 | Rejman et al. |
| 2018/0277835 A1 | 9/2018 | Ise et al. |
| 2019/0077275 A1* | 3/2019 | Capati .................... H01M 10/63 |
| 2019/0386610 A1* | 12/2019 | Regrut .................... H02S 40/22 |
| 2020/0044298 A1* | 2/2020 | Subramanian .......... B60L 50/64 |

FOREIGN PATENT DOCUMENTS

| | | |
|---|---|---|
| DE | 10 2012 207 999 A1 | 11/2013 |
| DE | 10 2016 203 424 A1 | 9/2016 |
| DE | 10 2017 200 770 A1 | 7/2018 |
| EP | 0 593 869 A1 | 4/1994 |
| EP | 2 187 472 A2 | 5/2010 |
| EP | 3 032 634 A1 | 6/2016 |
| JP | 2016-537768 A | 12/2016 |
| JP | 2018-152156 A | 9/2018 |
| JP | 2018-160435 A | 10/2018 |
| WO | WO 2017/139826 A1 | 8/2017 |

* cited by examiner

BATTERY PACK AND TREATMENT SYSTEM

FIELD OF APPLICATION AND PRIOR ART

The invention relates to a battery pack for supplying an electrically driven treatment apparatus with electric driving power and to a treatment system including such a battery pack and to an electrically driven treatment apparatus.

PROBLEM AND SOLUTION

The invention is based on the problem of providing a battery pack for supplying an electrically driven treatment apparatus with electric driving power, wherein the battery pack has improved properties, in particular a comparatively long service life, and a treatment system including such a battery pack and an electrically driven treatment apparatus.

The invention solves the problem by providing a battery pack and by providing a treatment system, according to the claimed invention. Advantageous developments and/or configurations of the invention are described and claimed herein.

The battery pack according to the invention is designed or configured for supplying, in particular automatic supplying, of an electrically driven treatment apparatus, in particular a gardening, forestry and/or construction apparatus, with electric driving power. The battery pack comprises a stack limiting structure, a plurality of pouch cells, an outer temperature sensor, in particular an electrical outer temperature sensor, and a control device, in particular an electrical control device. The pouch cells are disposed in a stack, in particular one on top of the other or superimposed. The stack is disposed within the stack limiting structure. The outer temperature sensor is disposed and designed or configured for measuring, in particular automatic measuring, of an outer temperature, in particular a value of the temperature, of the stack outside the stack at a border or an edge of the stack or the stack limiting structure, and/or outside the stack limiting structure. The control device is designed or configured for comparison, in particular automatic comparison, of the measured outer temperature and/or a quantity based on the measured outer temperature to at least one temperature comparative quantity. The at least one temperature comparative quantity is a function of at least one of the pouch cells, in particular predetermined. Furthermore, the control device is designed or configured for controlling, in particular automatic controlling, of the battery pack in response to a result of the comparison.

The arrangement of the outer temperature sensor allows measuring at a location where the outer temperature of the stack can be lowest or coldest, e.g. in winter, or highest or hottest, e.g. in summer, in particular in time before discharging or charging the battery pack, in particular the pouch cells.

The control device allows protection of the pouch cells, and thus of the battery pack, from damages due to discharging or charging under conditions of undercooling and/or overheating of the pouch cells.

This allows to keep safety-critical conditions of the pouch cells, and thus of the battery pack, low or even prevent them at all.

This allows a comparatively long service life of the pouch cells, and thus of the battery pack.

In particular, the pouch cells can be configured for supplying the treatment apparatus with the driving power. In addition or as an alternative, the pouch cells can be accumulator cells, or battery cells, or can be in each case individual rechargeable storage elements for electric energy working on an electrochemical basis. In particular, the pouch cells can be lithium-ion accumulator cells. Further in addition or as an alternative, the pouch cells can be electrically interconnected, in particular can be connected in series or in parallel. Further in addition or as an alternative, the pouch cells can be flat cells. Further in addition or as an alternative, the surface of the pouch cells can be rectangular. Further in addition or as an alternative, the pouch cells can be similar or identical, in particular of the same type and/or the same construction. Further in addition or as an alternative, the stack can be cuboid in shape. The pouch cells can be disposed in the stack with a respective main plane in parallel to each other and/or orthogonal to a stack direction.

The outer temperature sensor can be disposed on a corner of the stack or the stack limiting structure. In addition or as an alternative, on an edge or a corner can mean closer to the edge or the corner than to a center, in particular spaced from the edge or corner at a maximum of 20 millimeters (mm), in particular a maximum of 10 mm, in particular a maximum of 5 mm. Further in addition or as an alternative, the outer temperature sensor can have a thermal connection to the stack, in particular the pouch cells. Further in addition or as an alternative, the outer temperature sensor can be disposed spaced from the stack, in particular the pouch cells, at a maximum of 20 millimeters (mm), in particular a maximum of 10 mm, in particular a maximum of 5 mm. In particular, the outer temperature sensor can make physical contact to the stack limiting structure and/or the stack, in particular the pouch cells. Further in addition or as an alternative, the outer temperature sensor can be a negative temperature coefficient thermistor.

The at least one temperature comparative value can be a function of an electrochemistry of the pouch cells, in particular be predetermined. In addition or as an alternative, the at least one temperature comparative value can be at least one outer temperature limit value.

The control device can be configured for controlling, in particular stopping, the output of the electric driving power from the battery pack and/or an input of electric charging power to the battery pack, in particular upon going below, reaching or exceeding the at least one temperature comparative value, in particular the at least one outer temperature limit value, by the measured outer temperature and/or the quantity based on the measured outer temperature.

In a development of the invention, the outer temperature sensor is disposed on an edge, in particular a corner, of an outermost of the pouch cells.

In addition or as an alternative, the at least one outer temperature comparative value is a function of an outermost of the pouch cells, in particular the outermost of the pouch cells, in particular predetermined.

In particular, the outermost of the pouch cells can be at the very top of the stack or at a topside of the stack, or at the very bottom of the stack or at a bottom side of the stack, in particular in the stack direction.

In a development of the invention, the stack limiting structure is a stack housing, in particular a massive stack housing. This allows in case of bursting of the pouch cells mechanical stress on surrounding parts to be kept low or even prevented at all. In particular, the stack can be cuboid in shape. In addition or as an alternative, the stack housing can be partially or completely be made of aluminum.

In a development of the invention, the battery pack comprises an inner temperature sensor, in particular an electrical inner temperature sensor. The inner temperature sensor is disposed and designed or configured for measuring, in particular automatic measuring, of an inner temperature, in particular a value of the temperature, of the stack in the stack, in particular in the stack direction, in particular between two central pouch cells and/or in a center of a surface of the pouch cells. The control device is designed or configured for comparison, in particular automatic comparison, of the measured inner temperature and/or a quantity based on the measured inner temperature to at least one temperature comparative value, in particular a further temperature comparative value. The at least one temperature comparative value is a function of at least one of the pouch cells, in particular a central one of the pouch cells, in particular predetermined. Furthermore, the control device is designed or configured for controlling, in particular automatic controlling, of the battery pack in response to a result of the comparison.

The arrangement of the inner temperature sensor allows measuring at a location where the inner temperature of the stack can be lowest or coldest, e.g. in summer, or highest or hottest, e.g. in winter, in particular in time before discharging or charging the battery pack, in particular the pouch cells.

In particular, the inner temperature sensor can be different from the outer temperature sensor. In addition or as an alternative, the inner temperature sensor can be a negative temperature coefficient thermistor. Further in addition or as an alternative, in a center can mean closer to the center than to an edge, in particular spaced from the center at a maximum of 20 mm, in particular a maximum of 10 mm, in particular a maximum of 5 mm. Further in addition or as an alternative, the at least one temperature comparative value, in particular a further temperature comparative value, can be at least one inner temperature limit value. Further in addition or as an alternative, the quantity can be based on the measured outer temperature and the measured inner temperature, in particular be a difference of the measured inner temperature and the measured outer temperature. The at least one temperature comparative value can be a differential temperature comparative value, in particular a differential temperature value. Further in addition or as an alternative, the control device can be configured for controlling, in particular stopping, the output of the electric driving power from the battery pack and/or an input of electric charging power to the battery pack upon going below, reaching or exceeding the at least one temperature comparative value, in particular the at least one outer temperature limit value and/or the differential temperature value by the measured inner temperature and/or the quantity based on the measured inner temperature.

In a development of the invention, the battery pack comprises a sensor arrangement. The sensor arrangement is disposed in the stack. Furthermore, the sensor arrangement extends across a major part of a surface, in particular the surface, of the pouch cells and is designed or configured such that a height of the stack, in particular in the stack direction, across the extension is approximately equal. Moreover, the sensor arrangement has the inner temperature sensor. This allows an effect, in particular disadvantageous effect, of the sensor arrangement on the pouch cells, in particular flexible outer shells of the pouch cells, to be kept low or even prevented at all. In particular a deformation, in particular local deformation, and thus loading or stressing, in particular local loading, of the pouch cells to be kept low or even prevented at all. In particular, a major part of the surface can mean at least 70 percent (%), in particular at least 80%, in particular at least 90%, of the surface. In particular, the sensor arrangement can extend across the complete surface of the pouch cells. Further in addition or as an alternative, the sensor arrangement can have gaps across the extension. Further in addition or as an alternative, the height can be limited by the stack limiting structure. Further in addition or as an alternative, approximately equal can mean a deviation of a maximum of 5%, in particular a maximum of 2%, in particular a maximum of 1%. Further in addition or as an alternative, the height can be equal or homogeneous across the extension. Further in addition or as an alternative, the sensor arrangement can be disposed between two of the pouch cells and configured such that a distance between the two pouch cells across the extension can be approximately equal. Further in addition or as an alternative, the sensor arrangement can have an equal, in particular approximately equal, in particular constant, arrangement thickness, in particular in the stack direction, across the extension. Further in addition or as an alternative, the sensor arrangement can be rectangular.

In a development of the invention, the sensor arrangement has a pressure sensor, in particular an electrical pressure sensor. The pressure sensor is designed or configured for detecting, in particular automatic detecting, in particular measuring, a pressure force, in particular in the stack direction, acting on the pouch cells. The control device is designed or configured for comparison, in particular automatic comparison, of the detected, in particular measured, pressure force and/or a quantity based on the detected pressure force to a pressure limit value. The pressure limit value is predetermined by at least one of the pouch cells. Furthermore, the control device is designed or configured for controlling, in particular automatic controlling, of the battery pack in response to a result of the comparison. The pressure sensor allows detecting, in particular measuring, of an inflation, where present, of the pouch cells, in particular in the stack direction. In particular, the inflation together with the limited height of the stack can cause a buildup of the pressure force. The sensor arrangement allows a synergy effect. In particular, the pressure sensor can be configured for detecting the pressure force orthogonal to the surface and/or the main planes acting on the pouch cells. In addition or as an alternative, the pressure sensor can be configured for qualitative detection of the pressure force, in particular as a mechanical switch, or even quantitative measuring of the pressure force, in particular a value of the of the pressure force. Further in addition or as an alternative, the control device can be configured for controlling, in particular stopping, the output of the electric driving power from the battery pack and/or the input of electric charging power to the battery pack upon reaching or exceeding the pressure limit value by the detected, in particular measured, pressure force and/or the quantity based on the detected pressure force. Further in addition or as an alternative, the control device can be configured for obtaining a state of health of the battery pack as a function of the outer temperature and/or the inner temperature and/or the pressure force and for controlling the battery pack as a function of the obtained state of health.

In a development of the invention, the control device is designed or configured for controlling, in particular automatic controlling, in particular stopping, the output of the electric driving power and/or an input, in particular the input, of electric charging power, in particular the electric charging power. Furthermore, the control device is disposed, in particular completely and/or only, on a side of the stack, in particular on the stack. The outer temperature sensor is disposed, in particular completely and/or only, on an averted side of the stack, in particular on the at maximum remote edge of the stack or the stack limiting structure. This allows measuring of the outer temperature at a location where the outer temperature of the stack can be affected by the control device, in particular heat of the control device, only to a minor extent or not at all. In particular, the control device can be disposed outside the stack limiting structure.

In a development of the invention, the battery pack comprises a plurality of battery pack contacts. The battery pack contacts are designed or configured for electrical connection of the battery pack and the treatment apparatus with each other for supplying the treatment apparatus with electric driving power from the battery pack. Furthermore, the battery pack comprises a battery pack contact holder. The battery pack contact holder holds the battery pack contacts and the outer temperature sensor. Moreover, the battery pack contact holder is disposed on the stack limiting structure. The battery pack contact holder allows a synergy effect. In particular, the battery pack contacts can be disposed on a side of the stack opposite the control device.

In a development of the invention, the battery pack comprises a battery pack housing. The pouch cells, and in particular the stack limiting structure, are disposed within the battery pack housing. Furthermore, the battery pack comprises at least one air cooling circuit including a number of air inlet openings and a number of air outlet openings in the battery pack housing for a cooling air flow from the number of air inlet openings on the pouch cells, in particular the stack limiting structure, passing to the number of air outlet openings for cooling the pouch cells. The outer temperature sensor is disposed in the air cooling circuit between the number of air inlet openings and the number of air outlet openings, in particular facing the number of air inlet openings and/or the number of air outlet openings. In particular, the outer temperature sensor can be in contact, in particular direct contact, to air of the air cooling circuit or the cooling air flow.

In a development of the invention, the stack limiting structure has a thermal connection to the pouch cells and is thermally conductive. This allows heat dissipation from the pouch cells to the outside.

In a development of the invention, the battery pack comprises at least one thermal insulation. The at least one thermal insulation is disposed, in each case, between two of the pouch cells and extends across a major part of the surface of the pouch cells. This allows to reduce or even prevent completely heat dissipation from the pouch cells among each other. In particular, the at least one thermal insulation can comprise, in particular be, a foamed material, in particular sponge rubber. In addition or as an alternative, the at least one thermal insulation can be at least one buffer element. The at least one buffer element can be configured to buffer inflating, where present, of the pouch cells, in particular in the stack direction, across a buffer thickness of the at least one buffer element. This can allow to absorb or to compensate a slight, in particular uncritical, inflation, where present, of the pouch cells caused by aging.

In a development of the invention, the battery pack has, in particular the pouch cells have, a maximum electric driving power of a minimum of 1 kilowatt (kW), in particular a minimum of 2 kW, and/or of a maximum of 10 kW, in particular a maximum of 5 kW.

In addition or as an alternative, the battery pack has, in particular the pouch cells have, a nominal voltage, in particular an electrical nominal voltage, of a minimum of 10 Volts (V), in particular a minimum of 20 V, and/or of a maximum of 100 V, in particular a maximum of 50 V.

In addition or as an alternative, the battery pack has, in particular the pouch cells have, a maximum energy content, in particular an electrical maximum energy content, of a minimum of 100 Watt hours (Wh), in particular a minimum of 200 Wh, and/or of a maximum of 1000 Wh, in particular a maximum of 500 Wh.

In addition or as an alternative, the battery pack has a mass of a minimum of 0.5 kilograms (kg), in particular a minimum of 1 kg, and/or of a maximum of 10 kg, in particular a maximum of 5 kg.

In addition or as an alternative, the battery pack has a height, in particular in the stack direction, of a minimum of 2.5 centimeters (cm) and/or of a maximum of 10 cm, and/or a width of a minimum of 5 cm and/or of a maximum of 20 cm, and/or a depth of a minimum of 7.5 cm and/or of a maximum of 30 cm.

The treatment system according to the invention includes a battery pack, in particular the battery pack, as described above and an electrically driven treatment apparatus, in particular the electrically driven treatment apparatus. The battery pack and the treatment apparatus are designed or configured for electrical connection with each other for supplying, in particular automatic supplying, of the treatment apparatus with electric driving power from the battery pack.

In particular, the treatment system can be a treatment system for gardening, forestry and/or building construction. In addition or as an alternative, the treatment apparatus can be a treatment apparatus for gardening, forestry and/or building construction. Further in addition or as an alternative, the treatment apparatus can be a hand-guided, in particular floor-guided or hand-held, treatment apparatus. In particular hand-guided, in particular hand-held, treatment apparatus can mean that the treatment apparatus can have a maximum mass of 50 kilograms (kg), in particular of 20 kg, in particular of 10 kg. Further in addition or as an alternative, the treatment apparatus can include an electric drive motor.

Further in addition or as an alternative, the battery pack and the treatment apparatus can be configured for detachable electrical connection with each other, in particular without using a tool and/or without destruction, particularly by using plug connectors. Further in addition or as an alternative, the battery pack and the treatment apparatus can be configured for, in particular detachable, mechanical connection with each other, in particular without using a tool and/or detachable without destruction. In particular, the treatment apparatus can be configured for holding the battery pack.

In a development of the invention, the treatment apparatus has a battery accommodation, in particular a battery compartment. The battery accommodation is designed or configured for accommodating the battery pack.

In a development of the invention, the treatment apparatus is a saw, a pole pruner, a clearing saw, a brush cutter, hedge shears, a hedge cutter, a blower device, a leaf blower, a lopper, a cutoff grinder, a sweeper device, a sweeper roller, a sweeper brush, a lawn mower, a dethatcher, or a grass trimmer.

BRIEF DESCRIPTION OF THE DRAWINGS

Further advantages and aspects of the invention can be gathered from the claims and from the following description of preferred exemplary embodiments of the invention, which will be explained hereinbelow with reference to the figures. Therein:

DETAILED DESCRIPTION OF THE EXEMPLARY EMBODIMENTS

Figure 4:
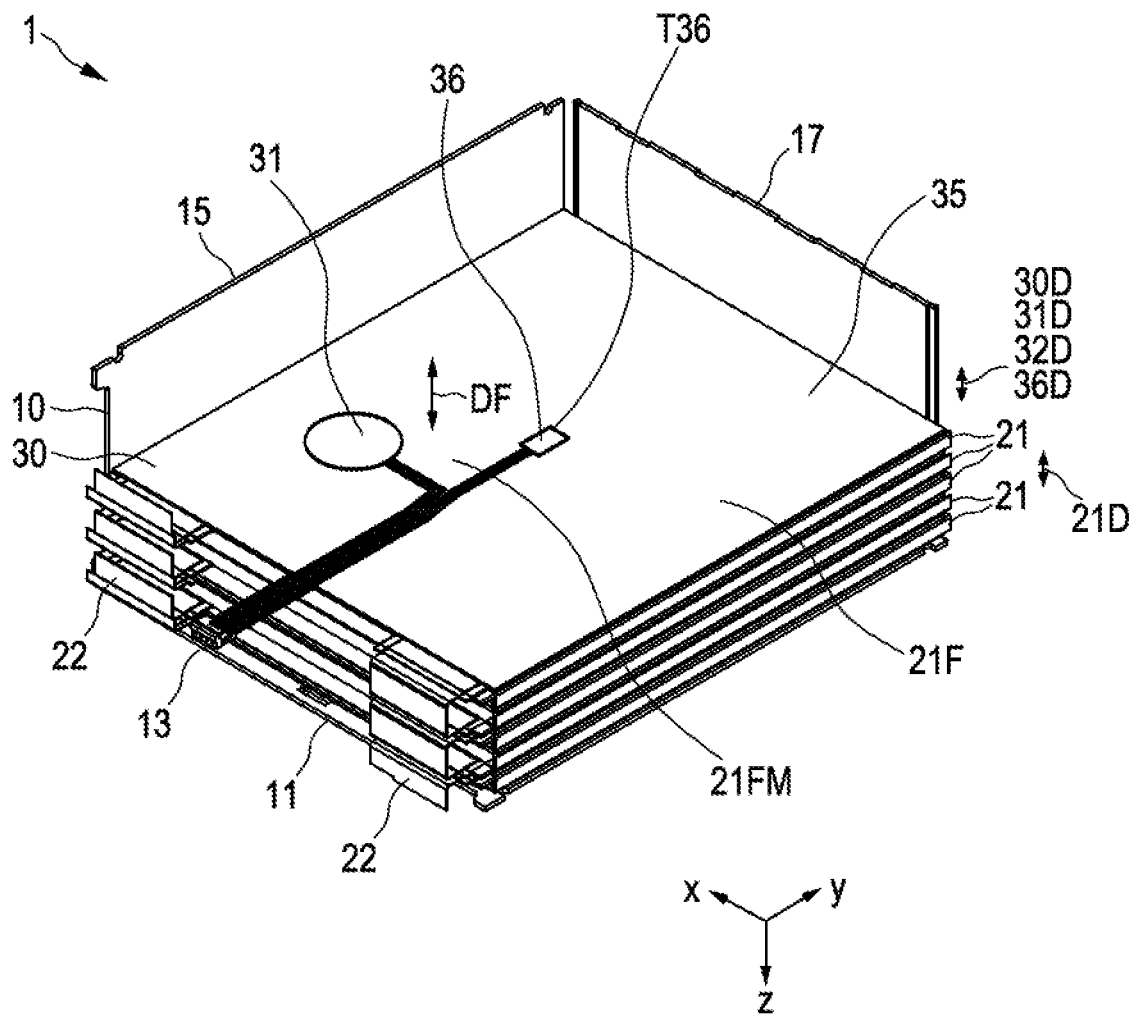
FIG. 4 shows a perspective view of the first stack limiting structure, of pouch cells and a sensor arrangement of the battery pack from FIG. 1.
Figure 5:
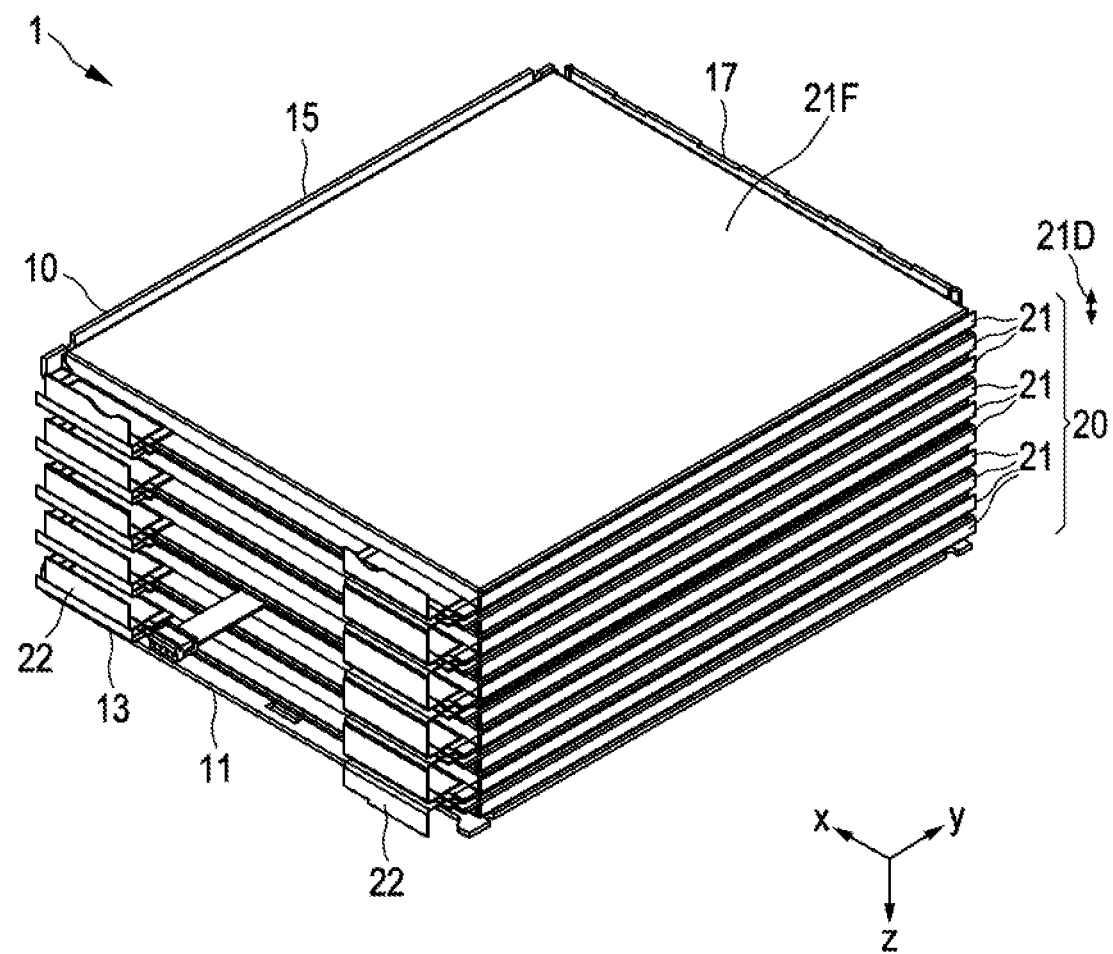
FIG. 5 shows a perspective view of the first stack limiting structure, of pouch cells and the sensor arrangement disposed in a stack of the battery pack from FIG. 1.
Figure 6:
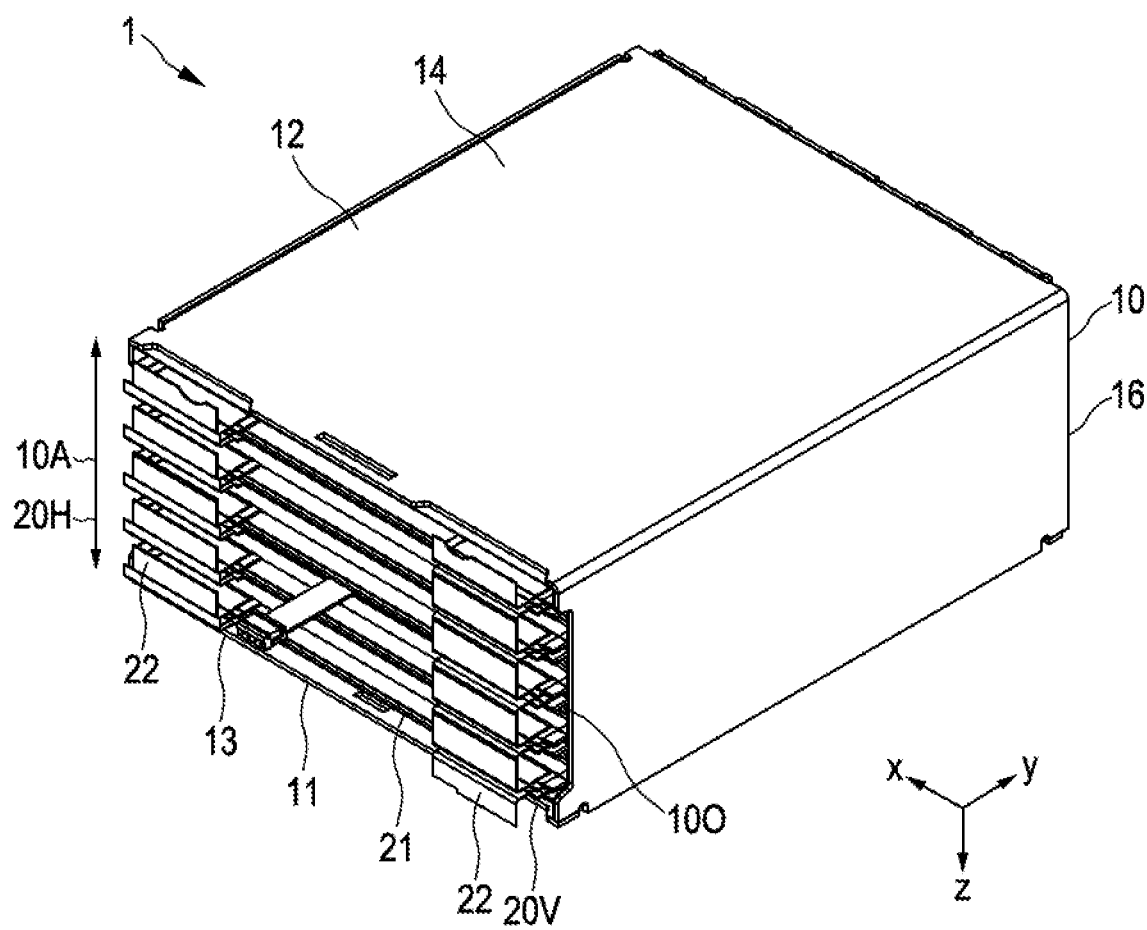
FIG. 6 shows a perspective view of the first stack limiting structure, the stack and a second stack limiting structure of the battery pack from FIG. 1.
Figure 7:
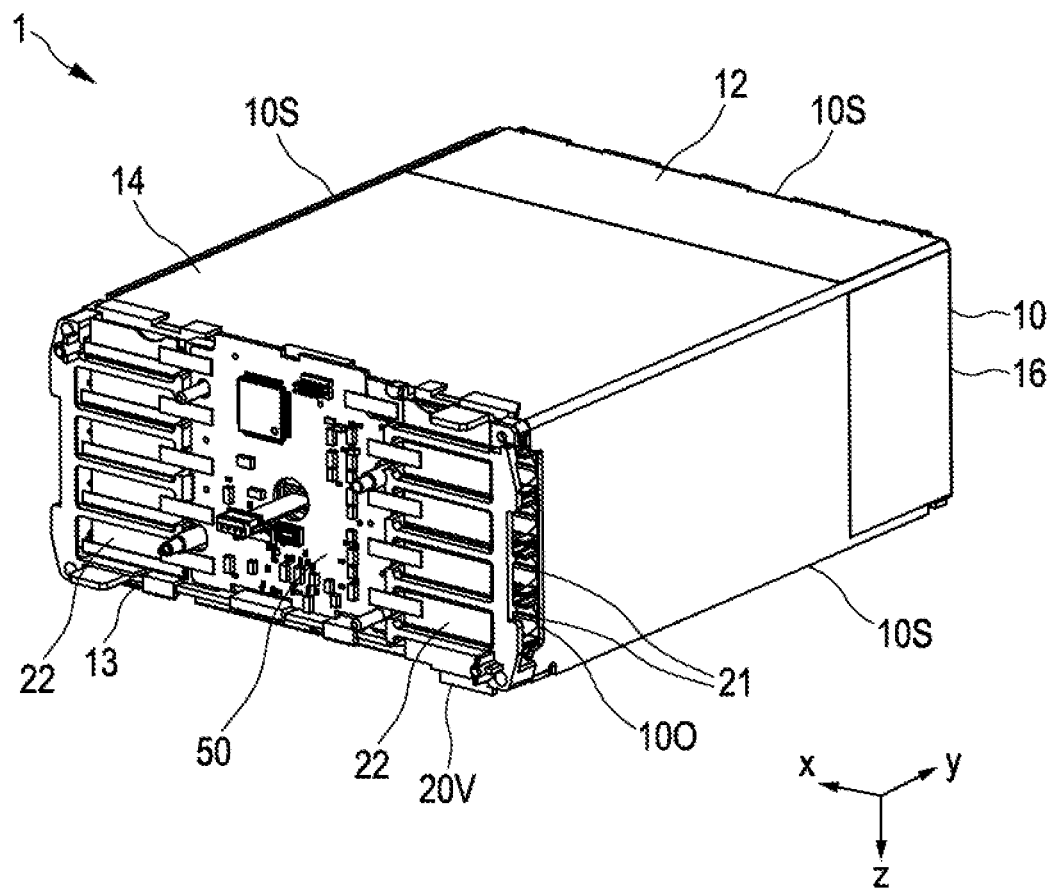
FIG. 7 shows a perspective view of the first stack limiting structure, the stack, the second stack limiting structure and a part of a control device of the battery pack from FIG. 1.
Figure 8:
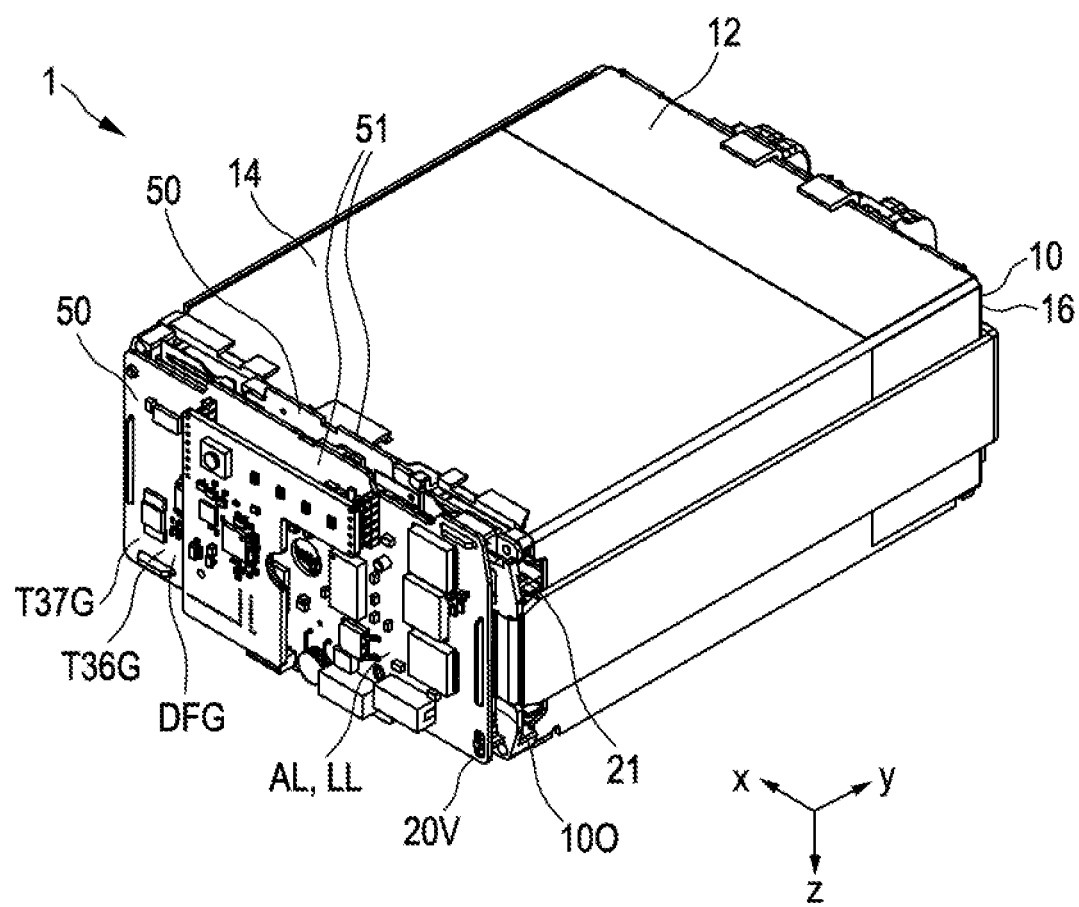
FIG. 8 shows a perspective view of the first stack limiting structure, the stack, the second stack limiting structure and the control device of the battery pack from FIG. 1.
Figure 9:
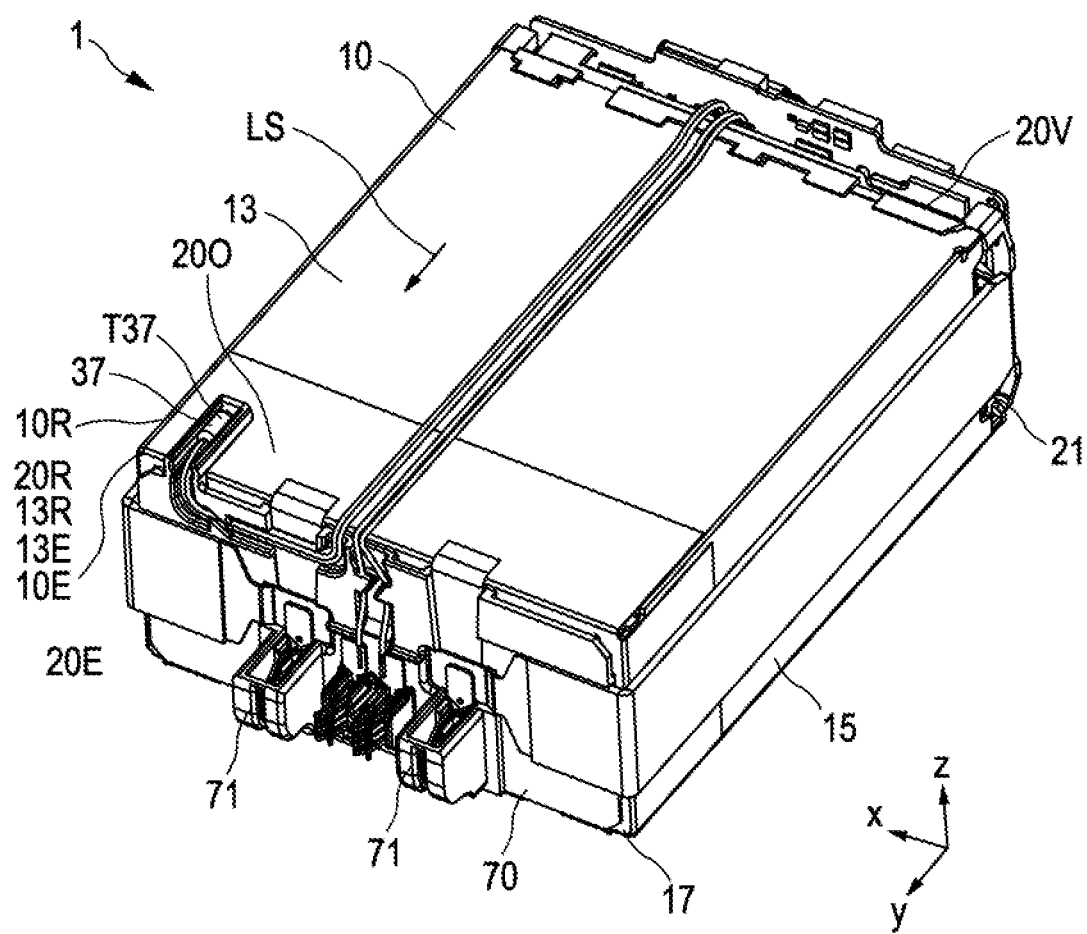
FIG. 9 shows a perspective view of a rear side of the first stack limiting structure, the stack, the second stack limiting structure, the control device and an outer temperature sensor of the battery pack from FIG. 1.
Figure 10:
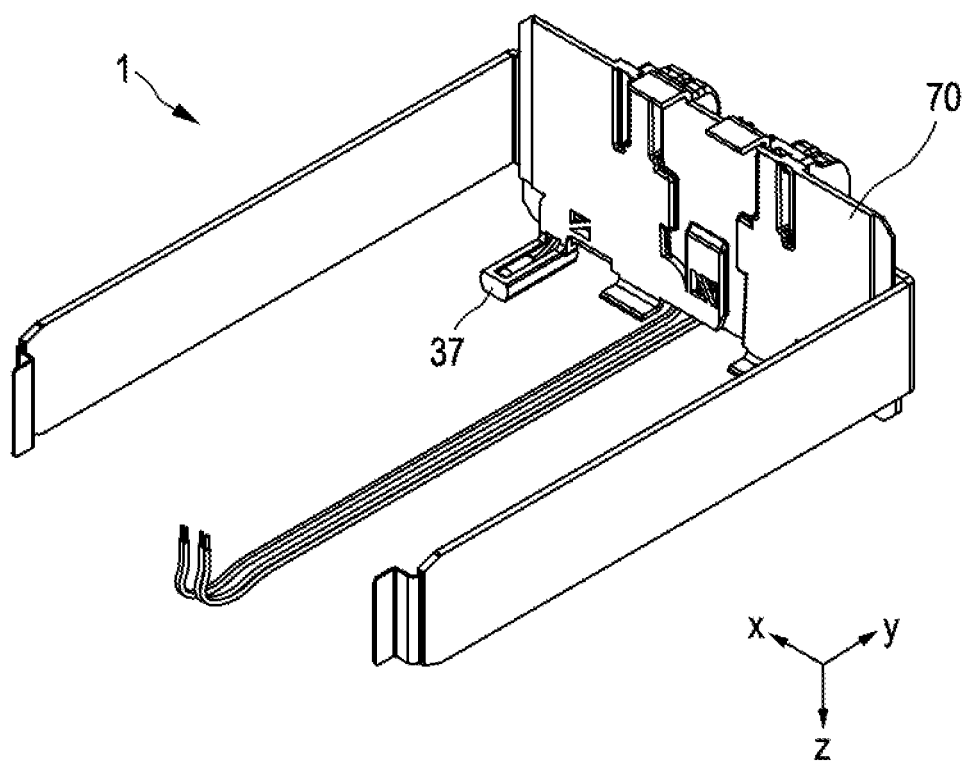
FIG. 10 shows a perspective view of the outer temperature sensor and a battery pack contact holder of the battery pack from FIG. 1.

FIGS. 1 to 12 show a battery pack 1 for supplying an electrically driven treatment apparatus 101 with an electric driving power AL. The battery pack 1 comprises a stack limiting structure 10, a plurality of pouch cells 21, an outer temperature sensor 37 and a control device 50. The pouch cells 21 are disposed in a stack 20, as illustrated in FIG. 5. The stack 20 is disposed within the stack limiting structure 10. The outer temperature sensor 37 is disposed and configured for measuring an outer temperature T37 of the stack 20 outside the stack 20 at an edge 20R, 10R, in particular a corner 20E, 10E, of the stack 20 or the stack limiting structure 10 and/or outside the stack limiting structure 10, as illustrated in FIGS. 9 and 10. The control device 50 is configured for comparison of the measured outer temperature T37 and/or a quantity based on the measured outer temperature T37 to at least one temperature comparative value T37G, as illustrated in FIGS. 7 and 8. The at least one temperature comparative value T37G is a function of at least one of the pouch cells 21, in particular predetermined. Furthermore, the control device 50 is configured for controlling the battery pack 1 in response to a result of the comparison.

In the exemplary embodiment shown, the battery pack 1 includes ten pouch cells 21. In alternative exemplary embodiments, the battery pack can include at least two pouch cells.

Moreover, in the exemplary embodiment shown, the pouch cells 21 respectively extend in directions x, y orthogonal to a stack direction z.

Further, in the exemplary embodiment shown, the outer temperature sensor 37 has a thermal connection to the stack 20, in particular the pouch cells 21. In particular, the outer temperature sensor 37 makes physical contact to the stack limiting structure 10.

Additionally, in the exemplary embodiment shown, the control device 50 is electrically connected to the outer temperature sensor 37.

Furthermore, in the exemplary embodiment shown, the control device 50 includes at least one circuit board.

Moreover, the outer temperature sensor is disposed on an edge 20R, in particular a corner 20E, of an outermost, in particular topmost, of the pouch cells 21.

In addition or as an alternative, the at least one temperature comparative value T37G is a function of the outermost of the pouch cells 21, in particular predetermined.

Further, the stack limiting structure 10 has a stack housing, in particular a massive stack housing, as illustrated in FIG. 6.

In the exemplary embodiment shown, the stack limiting structure or stack housing 10 comprises a first housing part 11 and a second housing part 12. The stack 20 is disposed between the first housing part 11 and the second housing part 12. The first housing part 11 and the second housing part 12 are mechanically interconnected by at least one material-bonding engagement 10S, in particular a welded connection.

In particular, in the exemplary embodiment shown, the stack limiting structure or stack housing 10 has five housing walls 13, 14, 15, 16, 17. The first housing part 11 has the first housing wall or top side wall 13, the housing wall, in particular peripheral side wall, 15 and the housing wall, in particular rear side wall, 17. The second housing part 12 has the second housing wall or bottom side wall 14 and the housing wall, in particular peripheral side wall, 16.

Additionally, in the exemplary embodiment shown, a height 20H of the stack 20, in particular in the stack direction z, is limited by the stack limiting structure or stack housing 10.

In particular, a second stack limiting structure or the second housing wall 14 is disposed opposite the first stack limiting structure or the first housing wall 13 with a fixed distance 10A. The stack 20 is disposed between the first stack limiting structure or first housing wall 13 and the second stack limiting structure or second housing wall 14. The height 20H of the stack 20, in particular in the stack direction z, is limited by the first stack limiting structure or first housing wall 13 and the second stack limiting structure or second housing wall 14, in particular by their fixed distance 10A.

Furthermore, in the exemplary embodiment shown, the first stack limiting structure or housing wall 13 and the second stack limiting structure or housing wall 14 extend respectively in directions x, y orthogonal to the stack direction z. In other words: the second stack limiting structure or housing wall 14 is disposed, in particular with a main plane, parallel to the first stack limiting structure or housing wall 13, in particular a main plane of the first stack limiting structure or housing wall 13. Moreover, in the exemplary embodiment shown, the distance 10A is in the stack direction z. Further, in the exemplary embodiment shown, the height 20H is equal to the distance 10A.

Additionally, in the exemplary embodiment shown, the outer temperature sensor 37 is disposed on an edge 13R, in particular a corner 13E, of the first stack limiting structure or housing wall 13.

In alternative exemplary embodiments, the outer temperature sensor can be disposed on an edge, in particular a corner, of the second stack limiting structure or housing wall.

Figure 12:
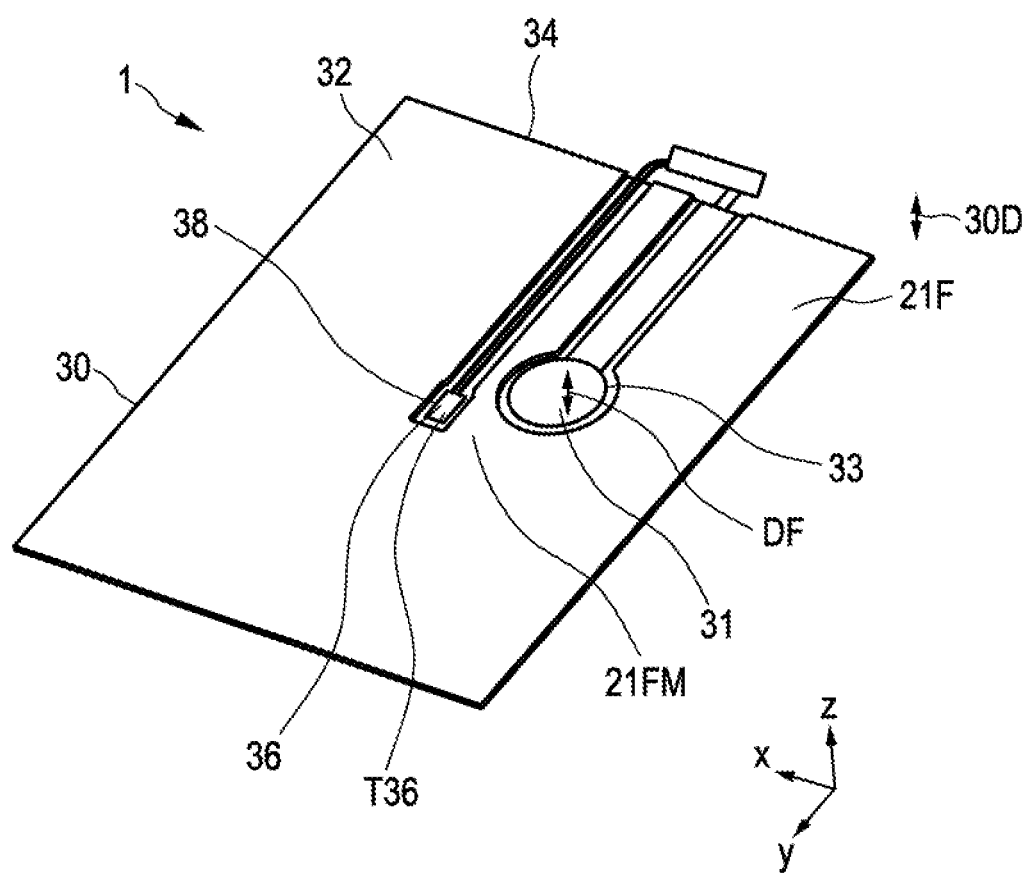
FIG. 12 shows an alternative sensor arrangement of the battery pack from FIG. 1.

Furthermore, the battery pack 1 comprises an inner temperature sensor 36, as illustrated in FIGS. 4 and 12. The inner temperature sensor 36 is disposed and configured for measuring an inner temperature T36 of the stack 20 in the stack 20, in particular between two central ones of the pouch cells 21, in particular in the stack direction z, and/or a center 21FM of a surface 21F of the pouch cells 21. The control device 50 is configured for comparison of the measured inner temperature T36 and/or a quantity based on the measured inner temperature T36 to at least one, in particular further, temperature comparative value T36G. The at least one temperature comparative value T36G is a function of at least one of the pouch cells, in particular a central one of the pouch cells 21, in particular predetermined. Moreover, the control device 50 is configured for controlling the battery pack 1 in response to a result of the comparison.

In other words: the inner temperature sensor 36 is disposed on a point of intersection of diagonals of the stack 20.

In the exemplary embodiment shown, the quantity is a difference of the measured inner temperature T36 and the measured outer temperature T37. The at least one temperature comparative value is an outer temperature limit value T37G, an inner temperature limit value T36G and a differential temperature value. In alternative exemplary embodiments, the at least one temperature comparative value can be the outer temperature limit value, the inner temperature limit value and/or a differential temperature comparative value, in particular the differential temperature value.

Further, in the exemplary embodiment shown, the control device 50 is electrically connected to the inner temperature sensor 36.

Additionally, the battery pack 1 comprises a sensor arrangement 30. The sensor arrangement 30 is disposed in the stack 20. Furthermore, the sensor arrangement 30 extends across a major part of the surface 21F of the pouch cells 21 and is configured such that the height 20H of the stack 20, in particular in the stack direction z, across the extension is approximately equal. Moreover, the sensor arrangement 30 includes the inner temperature sensor 36.

In the exemplary embodiment shown, the sensor arrangement 30 extends in the directions x, y orthogonal to the stack direction z. Further, in the exemplary embodiment shown, the sensor arrangement 30 extends across the complete surface 21F of the pouch cells 21. Additionally, in the exemplary embodiment shown, the sensor arrangement 30 has an equal arrangement thickness 30D, in particular in the stack direction z, across the extension.

In the illustrations of FIGS. 1 to 11, the sensor arrangement 30 is in one piece.

In the illustration of FIG. 12, the sensor arrangement 30 includes a compensation spacer 32. The compensation spacer 32 is disposed in the stack 20. Furthermore, the compensation spacer 32 is separate from the inner temperature sensor 36. Moreover, the compensation spacer 32 has at least one sensor recess 33, 38. The inner temperature sensor 36 is disposed in the sensor recess 38. A spacer thickness 32D of the compensation spacer 32 and a sensor thickness 36D of the inner temperature sensor 36 are approximately equal, in particular in the stack direction z.

Further, in FIGS. 1 to 11, the sensor arrangement 30 is a film 35. In FIG. 12, the sensor arrangement 30 includes a film 34, in particular the compensation spacer 32 is the film 34.

Furthermore, the sensor arrangement 30 has a pressure sensor 31. The pressure sensor 31 is configured for detecting, in particular measuring, a pressure force DF acting, in particular in the stack direction z, on the pouch cells 21. The control device 50 is configured for comparison of the detected, in particular measured, pressure force DF and/or a quantity based on the detected pressure force DF to a pressure limit value DFG. The pressure limit value DFG is predetermined by at least one of the pouch cells 21. Moreover, the control device 50 is configured for controlling the battery pack 1 in response to a result of the comparison.

In the illustration of FIG. 12, the pressure sensor 31 is disposed in the sensor recess 33. A sensor thickness 31D of the pressure sensor 31 is approximately equal to the spacer thickness 32D of the compensation spacer 32 and the sensor thickness 36D of the inner temperature sensor 36, in particular in the stack direction z.

Further, in the exemplary embodiment shown, the pressure sensor 31 is disposed in the center 21FM of the surface 21F of the pouch cells 21.

Additionally, in the exemplary embodiment shown, the control device 50 is electrically connected to the pressure sensor 31.

Furthermore, in the exemplary embodiment shown, the control device 50 is configured for measuring voltages of the pouch cells 21 and for controlling the battery pack 1 in response to the measured voltages. In particular, the control device 50 is electrically connected to the pouch cells 21, in particular cell tabs 22 of the pouch cells 21.

Moreover, in the exemplary embodiment shown, the battery pack 1 comprises a power output and/or power input detection device 51. The power output and/or power input detection device 51 is configured for detecting the output electric driving power AL from the battery pack 1 and/or the input electric charging power LL to battery pack 1 over the time t. The control device 50 is configured for varying, in particular increasing, the pressure limit value DFG in response to the detected output driving power AL and/or the detected input charging power LL over the time t.

Further, the control device 50 is configured for controlling, in particular stopping, the output of the electric driving power AL and/or the input of electric charging power LL. Additionally, the control device 50 is disposed on a side 20V, in particular front side, of the stack 20, in particular on the stack 20. The outer temperature sensor 37 is disposed on an averted side 200, in particular topside, of the stack 20, in particular on a most remote edge 20R, 10R of the stack 20 or the stack limiting structure 10.

Furthermore, the battery pack 1 comprises a plurality of battery pack contacts 71. The battery pack contacts 71 are configured for electrical connection of the battery pack 1 and the treatment apparatus 101 with each other for supplying the treatment apparatus 101 with electric driving power AL from the battery pack 1. Moreover, the battery pack 1 comprises a battery pack contact holder 70. The battery pack contact holder 70 holds the battery pack contacts 71 and the outer temperature sensor 37. Further, the battery pack contact holder 70 is disposed on the stack limiting structure 10.

Figure 11:
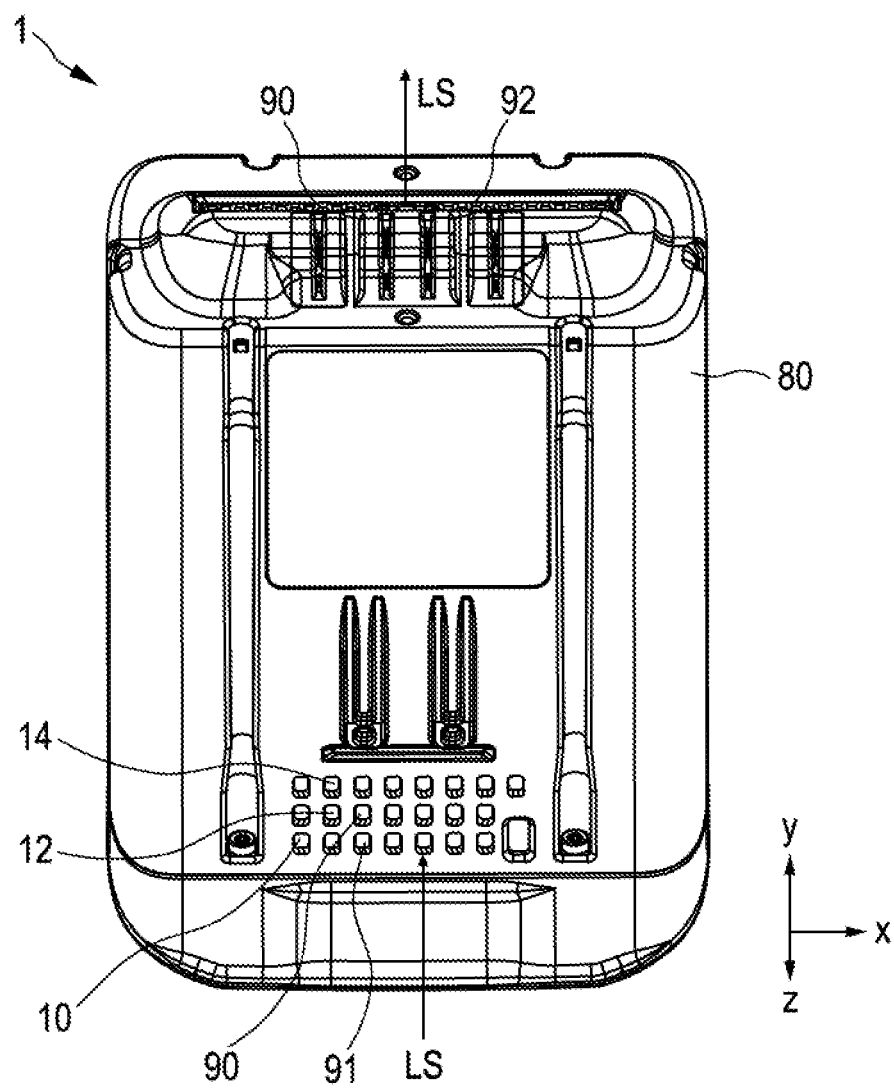
FIG. 11 shows a perspective view of a battery pack housing of the battery pack from FIG. 1.

Additionally, the battery pack 1 comprises a battery pack housing 80, as illustrated in FIG. 11. The pouch cells 21, and in particular the stack limiting structure 10, the outer temperature sensor 37, the inner temperature sensor 36, the pressure sensor 31 the control device 50, the power output and/or power input detection device 51 and the battery pack contact holder 70 are disposed within the battery pack housing 80. Furthermore, the battery pack 1 comprises at least one air cooling circuit 90 including a number of air inlet openings 91 and a number of air outlet openings 92 in the battery pack housing 80 for a cooling air flow LS passing from the number of air inlet openings 91 on the pouch cells 21, in particular the stack limiting structure 10, to the number of air outlet openings 92 for cooling the pouch cells 21. The outer temperature sensor 37 is disposed in the cooling circuit 90 between the number of air inlet openings 91 and the number of air outlet openings 92, in particular facing the number of air inlet openings 91 and/or the number of air outlet openings 92.

If the measured outer temperature T37 is relatively low, the pouch cells 21, in particular in time before charging, do not need to be cooled by the cooling air flow LS, in particular forced cooling air flow LS, even if the measured inner temperature T36 can be relatively high. This allows a relatively good heat distribution of the pouch cells 21 in the stack 20, in particular in contrast to cooling.

In addition or as an alternative, measuring of the outer temperature T37 and the inner temperature T36 and detecting of a thermal resistance, in particular of the pouch cells 21 in the stack 20, allow a prediction when charging could start and/or end in time, or how long discharging can continue in time, until an overheating of the pouch cells 21 occurs.

Moreover, the stack limiting structure or the stack housing 10 has a thermal connection to the pouch cells 21 and is thermally conductive.

In particular, the stack limiting structure or the stack housing 10 makes physical contact, in particular the housing walls 13, 14, 15, 16, 17 make physical contact, to the pouch cells 21, and heat-conducting paste is provided between the pouch cells 21 and the housing walls 15, 16, 17.

Further, in the exemplary embodiment shown, the stack limiting structure or the stack housing 10 has a common structure or housing opening 10O, in particular defined by the housing walls 13, 14, 15, 16. The pouch cells 21 are configured and disposed in the stack 20 within the stack housing 10 such that the cell tabs 22 are disposed on the front side or common tab side 20V of the stack 20 on the common structure or housing opening 10O.

Additionally, the battery pack 1 has at least one thermal insulation 60. The at least one thermal insulation 60 is disposed respectively between two of the pouch cells 21 and extends across a major part of the surface 21F of the pouch cells 21.

In the exemplary embodiment shown, the battery pack 1 has five thermal insulations 60. In alternative exemplary embodiments, the battery pack can have only a single thermal insulation.

Furthermore, in the exemplary embodiment shown, the at least one thermal insulation 60 extends in the directions x, y orthogonal to the stack direction z. Moreover, in the exemplary embodiment shown, the at least one thermal insulation 60 extends across the complete surface 21F of the pouch cells 21.

In addition, in the exemplary embodiment shown, the at least one thermal insulation 60 is a buffer element. The at least one buffer element 60 is configured to buffer inflating, where present, of the pouch cells 21, in particular in the stack direction z, across a buffer thickness 60D of the at least one buffer element 60.

In particular, in the exemplary embodiment shown, the at least one buffer element 60, in particular in time before buffering, has an equal buffer thickness 60D, in particular in the stack direction z, across the extension.

If cell thicknesses 21D of the pouch cells 21 increase, caused by inflating of the pouch cells 21, the inflation can no longer be buffered by the at least one buffer element 60, and as a result, the pressure force DF builds up, this event is detected by the pressure sensor 31.

Further, in the exemplary embodiment shown, the cell tabs 22 and the control device 50 are enclosed by casting compound, in particular heat conducting casting compound. The casting compound reaches up to the outer shells of the pouch cells 21.

Moreover, in the exemplary embodiment shown, the battery pack 1 has a maximum electric driving power MAL of 3 kW. In alternative exemplary embodiments, the battery pack can have a maximum electric driving power of a minimum of 1 kW and/or a maximum of 10 kW.

Additionally, in the exemplary embodiment shown, the battery pack 1 has nominal voltage NSP of 36 V. In alternative exemplary embodiments, the battery pack can have a nominal voltage of a minimum of 10 V and/or a maximum of 100 V.

Additionally, in the exemplary embodiment shown, the battery pack 1 has a maximum energy content MEI of 337 Wh. In alternative exemplary embodiments, the battery pack can have a maximum energy content of a minimum of 100 Wh and/or a maximum of 1000 Wh.

Additionally, in the exemplary embodiment shown, the battery pack 1 has a mass ml of 2 kg. In alternative exemplary embodiments, the battery pack can have a mass of a minimum of 0.5 kg and/or a maximum of 10 kg.

Additionally, in the exemplary embodiment shown, the battery pack 1 has a height 1H, in particular in the stack direction z, of 5 cm, a width 1B, in particular in the direction x, of 10 cm, and a depth 1T, in particular in the direction y, of 15 cm. In alternative exemplary embodiments, the battery pack can have a height of a minimum of 2.5 cm and/or of a maximum of 10 cm, and/or a width of a minimum of 5 cm and/or of a maximum of 20 cm, and/or a depth of a minimum of 7.5 cm and/or of a maximum of 30 cm.

Figure 1:
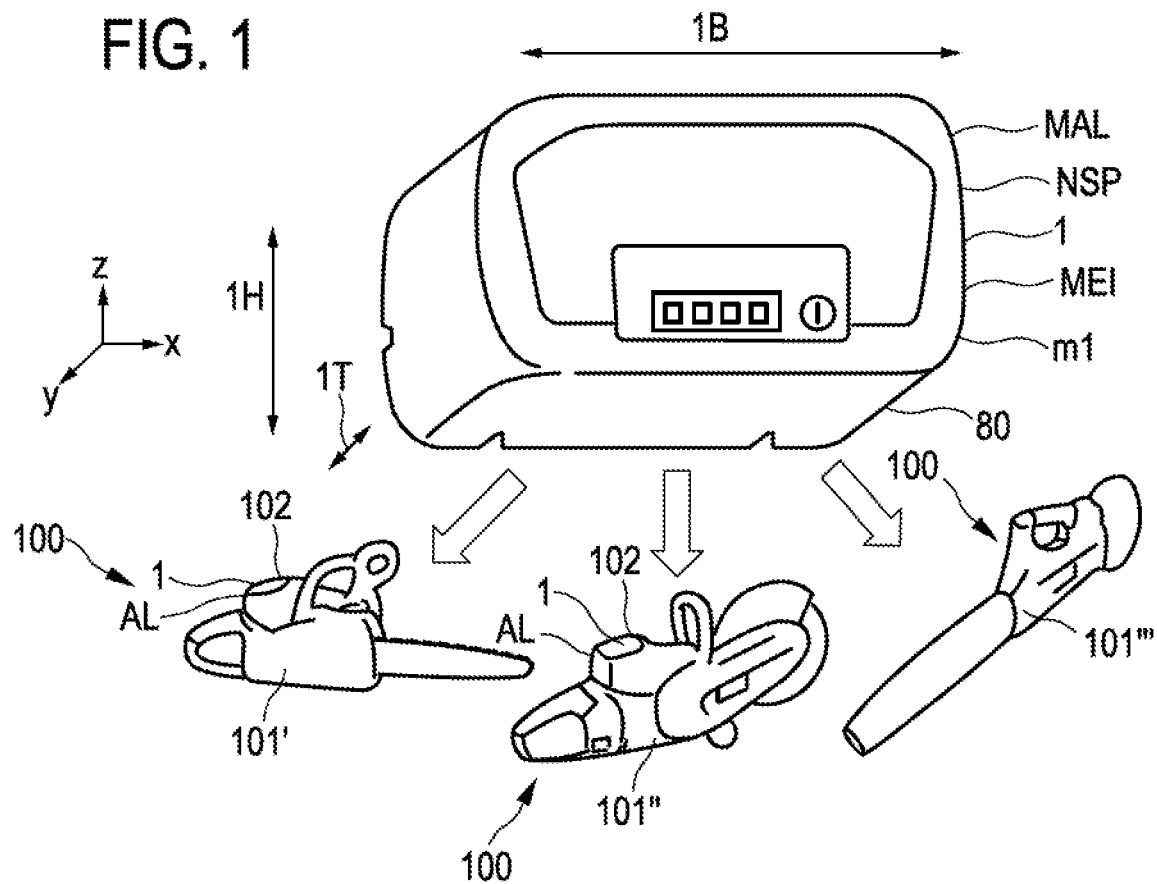
FIG. 1 shows a perspective view of a treatment system including a battery pack and an electrically driven treatment apparatus in the form of a saw, a cutoff grinder and a blower device.
Figure 2:
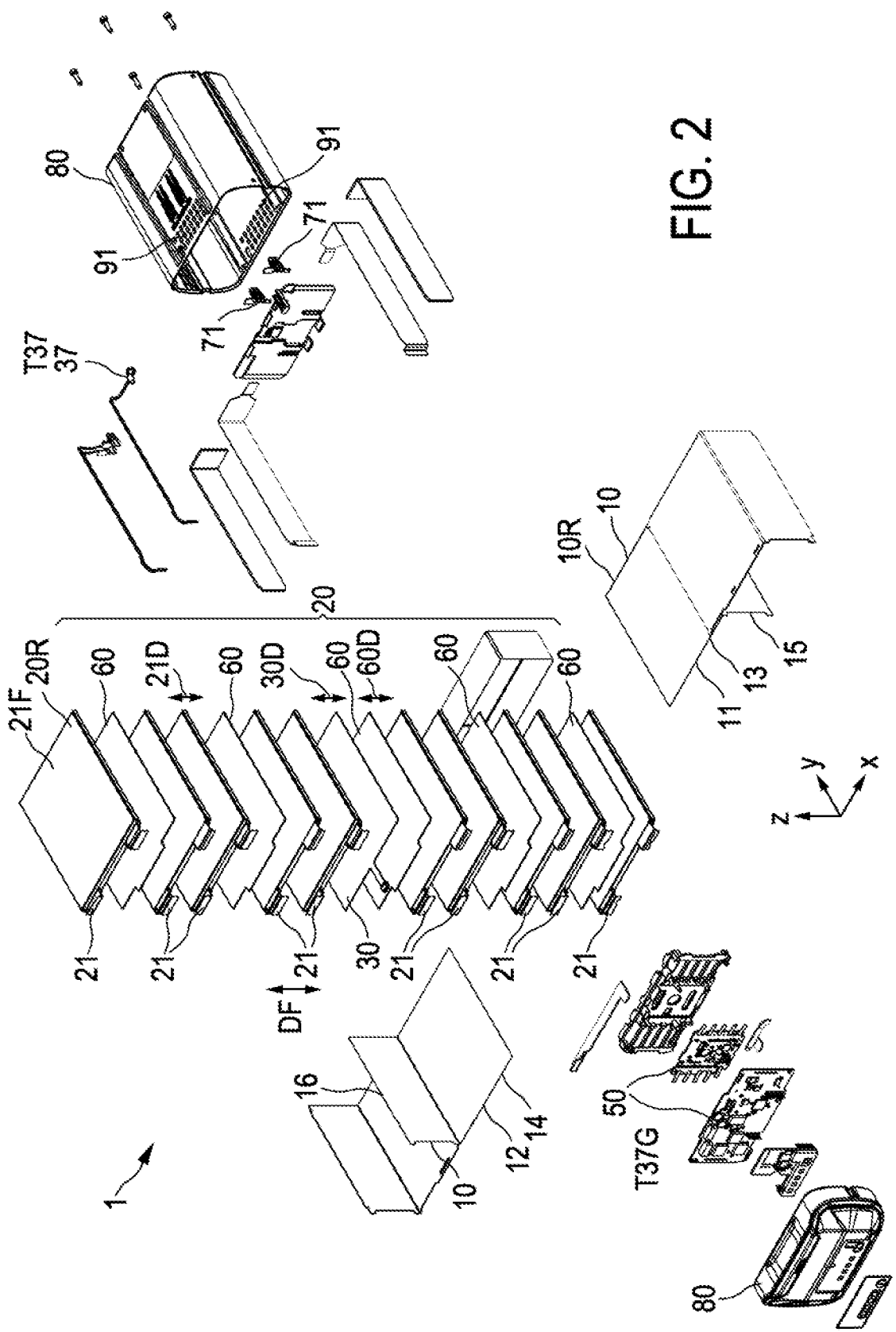
FIG. 2 shows an exploded view of the battery pack from FIG. 1.
Figure 3:
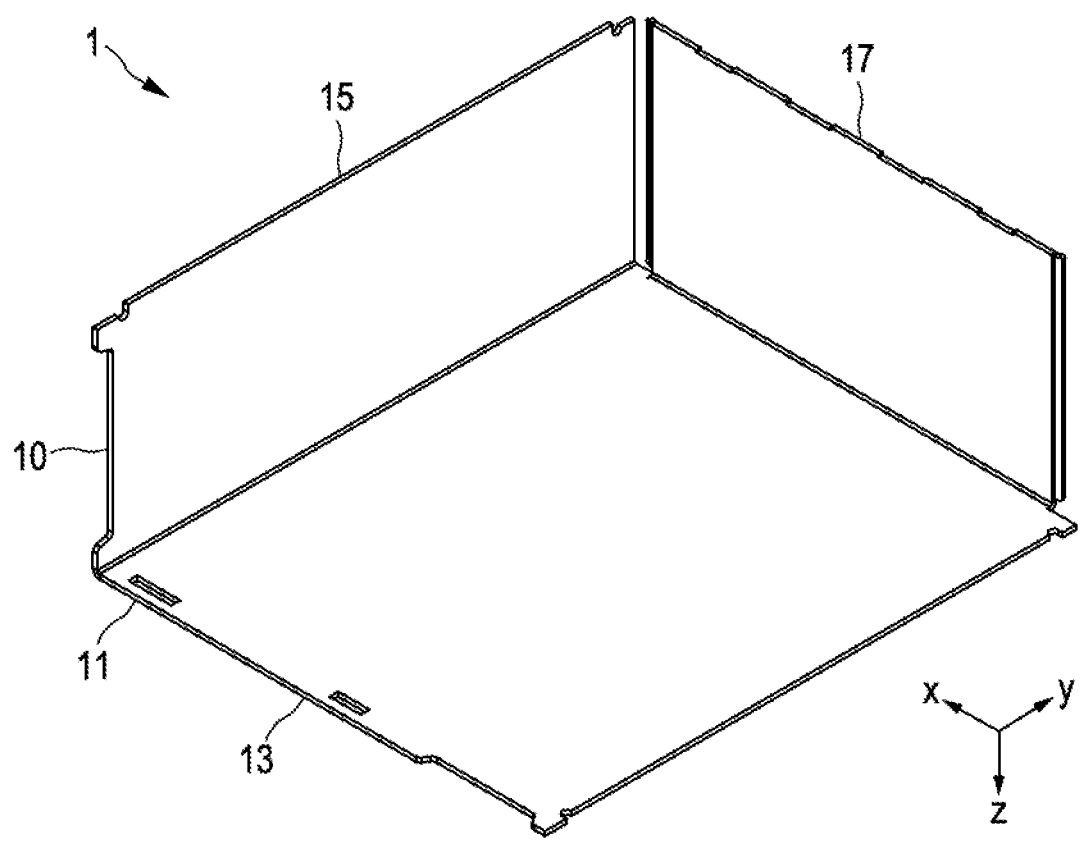
FIG. 3 shows a perspective view of a first stack limiting structure of the battery pack from FIG. 1.

FIG. 1 shows a treatment system 100 according to the invention. The treatment system 100 comprises the battery pack 1 and an electrically driven treatment apparatus 101. The battery pack 1 and the electrically driven treatment apparatus 101 are configured for electrical connection with each other for supplying the treatment apparatus 101 with electric driving power AL from the battery pack 1, in particular are electrically connected.

In detail, the treatment apparatus 101 has a battery accommodation 102. The battery accommodation 102 is configured for accommodating the battery pack 1. In particular, the battery pack 1 is accommodated.

In the illustration of FIG. 1, the electrically driven treatment apparatus 101 is a saw 101', a cutoff grinder 101", or a blower device 101'''. In alternative exemplary embodiments, the treatment apparatus can be a pole pruner, a clearing saw, a brush cutter, hedge shears, a hedge cutter, a leaf blower, a lopper, a sweeper device, a sweeper roller, a sweeper brush, a lawn mower, a dethatcher, or a grass trimmer.

As is made clear by the illustrated and above explained exemplary embodiments, the invention provides a battery pack for supplying an electrically driven treatment apparatus with electric driving power, wherein the battery pack has improved properties, in particular has a comparatively long service life, and a treatment system including such a battery pack and an electrically driven treatment apparatus.

What is claimed is:

1. A battery pack for supplying an electrically driven treatment apparatus with an electric driving power, the battery pack comprising:

a stack limiting structure;
a plurality of pouch cells having cell tabs, wherein the pouch cells are disposed in a stack, wherein the stack is disposed within the stack limiting structure;
an outer temperature sensor, wherein the outer temperature sensor is disposed and configured for measuring an outer temperature of the stack outside the stack at an edge of the stack or the stack limiting structure, and/or outside the stack limiting structure; and
a control device, wherein the control device is configured for comparison of the measured outer temperature and/or a quantity based on the measured outer temperature to at least one temperature comparative value;
a plurality of battery pack contacts, wherein the battery pack contacts are configured for electrical connection of the battery pack and the treatment apparatus with each other for supplying the treatment apparatus with electric driving power from the battery pack; and
a battery pack contact holder, wherein the battery pack contact holder holds the battery pack contacts and the outer temperature sensor, and wherein the battery pack contact holder is disposed on the stack limiting structure, wherein
the at least one temperature comparative value is a function of at least one of the pouch cells,
the control device is configured for controlling the battery pack in response to a result of the comparison,
the control device is configured for controlling an output of the electric driving power and/or an input of electric charging power and is disposed on a side of the stack, and
the outer temperature sensor and the plurality of battery pack contacts are disposed on an opposite half averted side of the stack or the stack limiting structure from the side of the stack on which the control device is disposed.

2. The battery pack according to claim 1, wherein at least one of:
the outer temperature sensor is disposed on an edge of an outermost one of the pouch cells, and
the at least one temperature comparative value is a function of an outermost one of the pouch cells.

3. The battery pack according to claim 1, wherein the stack limiting structure has a stack housing.

4. The battery pack according to claim 1, the battery pack further comprising:
an inner temperature sensor, wherein the inner temperature sensor is disposed and configured for measuring an inner temperature of the stack in the stack, and
wherein the control device is configured for comparison of the measured inner temperature and/or a quantity based on the measured inner temperature to at least one further temperature comparative value, wherein
the at least one further temperature comparative value is a function of at least one of the pouch cells, and
the control device is configured for controlling the battery pack in response to a result of the comparison.

5. The battery pack according to claim 4, the battery pack further comprising:
a sensor arrangement, wherein
the sensor arrangement is disposed in the stack,
the sensor arrangement extends across a major part of a surface of the pouch cells and is configured such that a height of the stack across the major part that the sensor arrangement extends is approximately equal, and
the sensor arrangement has the inner temperature sensor.

6. The battery pack according to claim 5, wherein
the sensor arrangement has a pressure sensor, wherein the pressure sensor is configured for detecting a pressure force acting on the pouch cells, and
the control device is configured for comparison of the detected pressure force and/or a quantity based on the detected pressure force to a pressure limit value, wherein
the pressure limit value is predetermined by at least one of the pouch cells, and
the control device is configured for controlling the battery pack in response to a result of the comparison.

7. The battery pack according to claim 1, the battery pack further comprising:
a battery pack housing, wherein the pouch cells, and the stack limiting structure, are disposed within the battery pack housing; and
at least one air cooling circuit including a number of air inlet openings and a number of air outlet openings in the battery pack housing for a cooling air flow from the number of air inlet openings onto the pouch cells, passing to the number of air outlet openings, for cooling the pouch cells, wherein
the outer temperature sensor is disposed in the air cooling circuit between the number of air inlet openings and the number of air outlet openings facing the number of air inlet openings and/or facing the number of air outlet openings.

8. The battery pack according to claim 1, wherein
the stack limiting structure has a thermal connection to the pouch cells and is thermally conducting.

9. The battery pack according to claim 1, the battery pack further comprising:
at least one thermal insulation, wherein the at least one thermal insulation is disposed respectively between two of the pouch cells and extends across a major part of the surface of the pouch cells.

10. The battery pack according to claim 1, wherein at least one of:
the battery pack has a maximum electric driving power of a minimum of 1 kW and/or of a maximum of 10 kW,
the battery pack has a nominal voltage of a minimum of 10 V and/or of a maximum of 100 V,
the battery pack has a maximum energy content of a minimum of 100 Wh and/or of a maximum of 1000 Wh,
the battery pack has a mass of a minimum of 0.5 kg and/or of a maximum of 10 kg, and
the battery pack has a height of a minimum of 2.5 cm and/or of a maximum of 10 cm, a width of a minimum of 5 cm and/or of a maximum of 20 cm, and a depth of a minimum of 7.5 cm and/or of a maximum of 30 cm.

11. A treatment system, comprising:
a battery pack according to claim 1; and
an electrically driven treatment apparatus,
wherein the battery pack and the treatment apparatus are configured for electrical connection with each other for supplying the treatment apparatus with electric driving power from the battery pack.

12. The treatment system according to claim 11, wherein
the treatment apparatus has a battery accommodation, wherein the battery accommodation is configured for accommodating the battery pack.

13. The treatment system according to claim 11, wherein
the treatment apparatus is one of: a saw, a pole pruner, a clearing saw, a brush cutter, hedge shears, a hedge cutter, a blower device, a leaf blower, a lopper, a cutoff grinder, a sweeper device, a sweeper roller, a sweeper brush, a lawn mower, a dethatcher or a grass trimmer.

\* \* \* \* \*